United States Patent [19]

Kraus et al.

[11] Patent Number: 4,655,308

[45] Date of Patent: Apr. 7, 1987

[54] ARRANGEMENT OF STEERING WHEEL AND CONTROL MECHANISMS

[75] Inventors: Ulrich Kraus; Elmar Egle; Leonhard Schmude, all of Ulm, Fed. Rep. of Germany

[73] Assignee: Iveco Magirus AG, Ulm, Fed. Rep. of Germany

[21] Appl. No.: 777,944

[22] Filed: Sep. 19, 1985

[51] Int. Cl.$^4$ ................................................ G01D 3/10
[52] U.S. Cl. .................................... 180/78; 74/484 R; 74/552; 340/22
[58] Field of Search ........................... 180/78; 340/22; 74/484 R, 552

[56] References Cited

U.S. PATENT DOCUMENTS 4,368,454 1/1983 Pilatzki .................................. 180/78
4,464,933 8/1984 Santis .................................. 74/484 R
4,485,371 11/1984 Yamada et al. ........................ 74/552

Primary Examiner—John J. Love
Assistant Examiner—Donn McGiehan
Attorney, Agent, or Firm—Becker & Becker, Inc.

[57] ABSTRACT

An arrangement for the steering wheel and control mechanisms for a motor vehicle. Transverse arms are attached to the steering arm near the steering column below the plane of steering the wheel. The lateral ends of the transverse arms are rigidly connected with a U-shaped frame portion for switches in order to form a closed frame member having an inner hollow space. The frame member is essentially parallel to the plane of the steering wheel. Switch levers and rotary switches are disposed on the lateral arms of the frame member, and monitoring devices for the vehicle are disposed on the upper cross member of the frame. The switch members and monitoring devices are disposed in an optimum visual and accessibility region for the driver.

5 Claims, 4 Drawing Figures

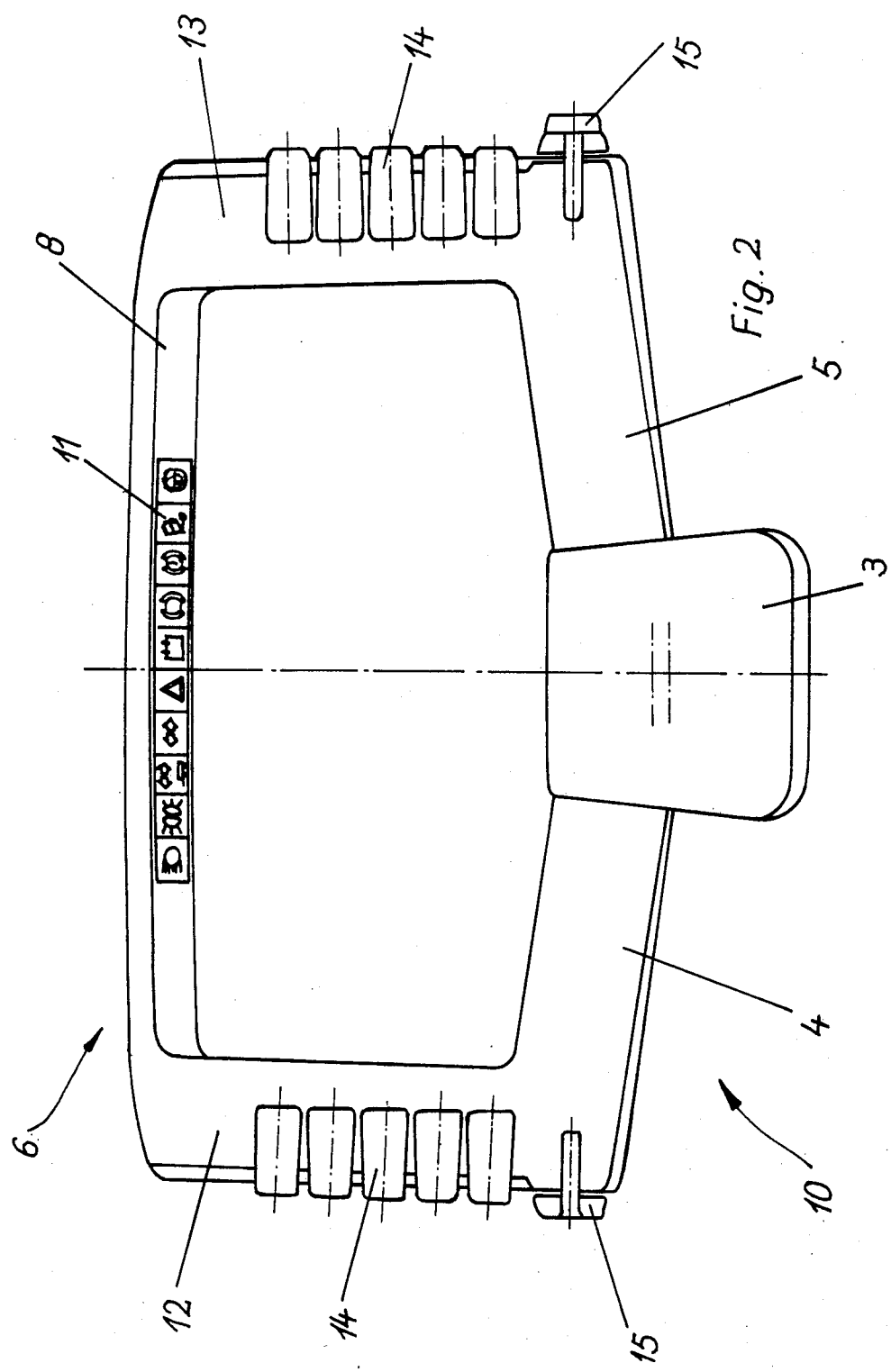

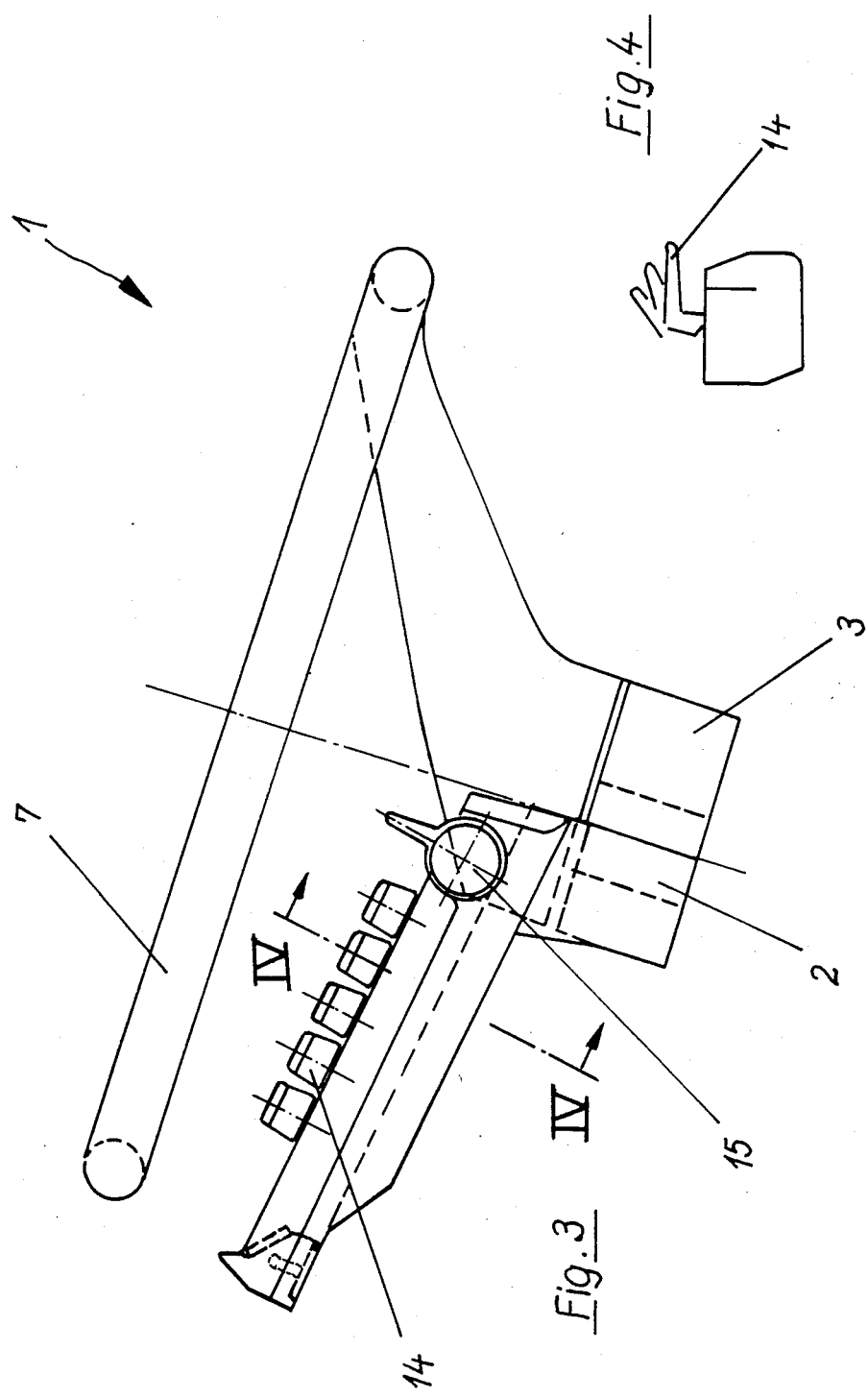

ARRANGEMENT OF STEERING WHEEL AND CONTROL MECHANISMS

BACKGROUND OF THE INVENTION

1. Field of the Invention

The present invention relates to a control mechanisms and steering wheel arrangement for a motor vehicle, including transverse arms which are attached to the steering arm below the plane of the steering wheel and near the steering column; the transverse arms essentially extend in the transverse direction of the vehicle, and serve for the mounting of control mechanisms for the vehicle.

2. Description of the Prior Art

German Offenlegungsschrift No. 28 27 338 discloses an arrangement of the aforementioned general type where the transverse arms are embodied as brackets that can be pivoted about the steering axis. Disposed at the front end of the brackets are switching elements which are angled-off or concave relative to the plane of the steering wheel; switches are integrated on the upper surfaces as well as the side and end faces of the switch elements. Furthermore, the brackets can be adjusted in the direction of the steering axis. This heretofore known arrangement is expedient for meeting the conditions and requirements of certain specialized vehicles. However, for customary commerical vehicles, especially road vehicles, this known arrangement is too expensive and is also not desirable, especially since the switches thereof are not very visible to the driver. Furthermore, the pivotability of the brackets adversely affects the safety with common commercial vehicles due to the alteration of the customary switch positions.

An object of the present invention, while avoiding the drawbacks of the heretofore known arrangement, is to provide an arrangement of steering wheel and control mechanisms of the aforementioned general type which, with simple means, results in optimum operating conditions, especially also for common commercial vehicles.

BRIEF DESCRIPTION OF THE DRAWINGS

This object, and other objects and advantages of the present invention, will appear more clearly from the following specification in conjunction with the accompanying drawings, in which:

FIG. 2 is a plan view of the arrangement of FIG. 1, with the steering wheel being omitted;

FIG. 3 is a schematic side view of the inventive arrangement; and

FIG. 4 is a section taken along the line IV—IV in FIG. 3.

SUMMARY OF THE INVENTION

Figure 1:
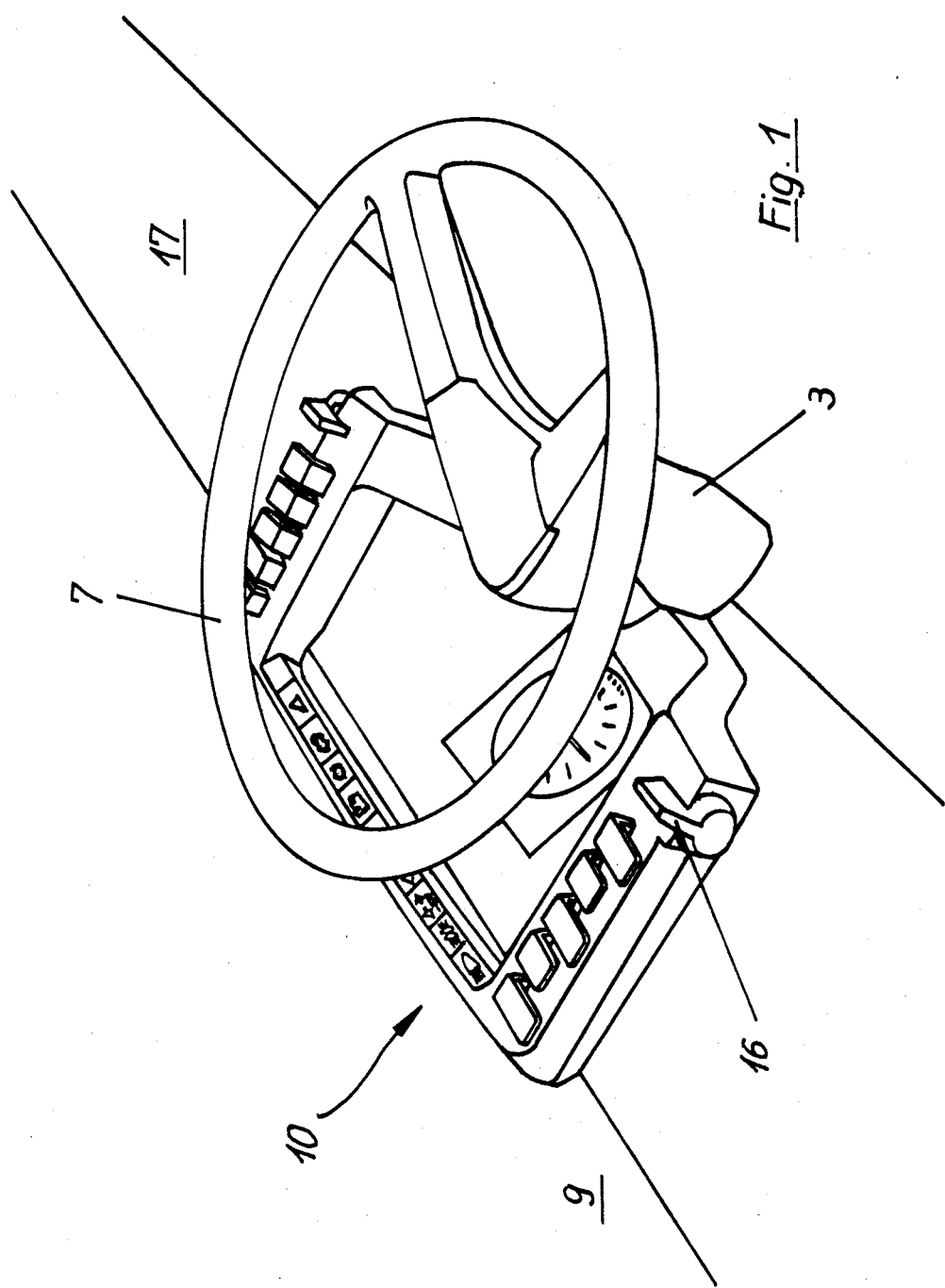
FIG. 1 is a perspective view of one inventive embodiment of a control mechanisms and steering wheel arrangement for a commerical vehicle.

The arrangement of the present invention is characterized primarily by an essentially U-shaped frame portion which serves for the mounting of the control mechanisms; this frame portion is fixedly connected to those ends of the transverse are remote from the steering column; the frame portion is disposed in a plane which is approximately parallel to the plane of the steering wheel, and has a base which faces the front of the vehicle.

This frame portion, together with the transverse arms connected thereto, serve as the carrier body for the control mechanisms, and when the steering wheel is viewed in plan, are preferably embodied as an essentially rectangular, closed frame which can be economically mass produced as a molded part, i.e. the frame portion and the transverse arms are integral with one another.

The frame is dimensioned relative to the steering wheel in such a way that when the latter is viewed in plan, the upper half of the steering wheel is approximately linearly surrounded by the frame, so that the operator, namely the driver of the vehicle, when he looks upon the steering wheel, can see and operate the control mechanisms which are mounted on the frame and are visible beyond the steering wheel. Nevertheless, the frame is disposed in a non-disrupting location of the vehicle just below the steering wheel, and does not appreciably affect the line of sight to the dashboard itself. Furthermore, despite the arrangement of the inventive frame, the driver still has enough free space for his legs.

A particularly economical manufacture, and attractive physical appearance, results if the transverse areas are integrated with the steering arm. Due to the fixed mounting of the switch carrier body, i.e. the frame, to the steering arm, when the slant or height of the steering wheel is adjusted, the carrier body necessarily always maintains the same spacing from the steering wheel. This results in an optimum operation of the switches in every position of the steering wheel.

Pursuant to a preferred further embodiment of the present invention, the upper surface of the U-shaped frame portion for the control mechanisms is planar, yet is angled-off in such a way that in relationship to the horizontal, the angling-off of the upper side of the base is greater than the angling-off or slant of the steering wheel. Consequently, the driver looks essentially at right angles upon the angled-off surface of the frame portion on which are disposed preferably monitoring devices for the vehicle, for example in the form of lights.

The upper sides of the arms of the U-shaped frame portion are similarly planar, with switch levers (two or multi-position switches) being provided along these upper surfaces. When viewed from the side, these switch levers are preferably L-shaped, and can be operated or grasped by an operator or driver from above as well as from below, i.e. from the outer side. Nevertheless, a switch lever cannot be accidentally actuated, for example from below by an unintentional movement of the knee.

Four to five switch levers are preferably provided on each arm of the frame portion, so that one finger of an operator can operator a number of switch levers, which are disposed at a comfortable distance from the rim of the steering wheel, where, for example, the thumb of the operating hand is resting.

Rotary switches also can be provided in the region of the connecting location between the transverse arms and the associated side arms are of the frame portion. The axes of rotation of the rotary switches are essentially disposed in the transverse direction of the vehicle and in the plane of the frame, with the radially extending control elements of the rotary switches being directed upwardly, where they can also be easily reached by a finger of the operating hand and can be actuated, in this case in the longitudinal direction of the vehicle.

It is particularly advantageous to provide, at a suitable location beneath the frame facing the dashboard of the vehicle, at least one direct lighting source for the instruments located in the dashboard. Such a lighting source provides an optimum illumination of the dashboard without blinding the driver. Furthermore, in the event of problems, such a lighting source is easily accessible The present invention thus provides a particularly simple construction for a switch support-body having multiple functions (switching device, monitoring device, direct lighting source); this carrier body can be a continuous molded part which, from the driver's viewpoint, looks like an upside-down U. The switches and the monitoring devices are disposed in the carrier body in such a way that they are clearly visible and fully functional, and can be easily reached by the driver. Due to simple construction, the inventive arrangement is particularly suitable for commercial vehicles which are driven on the streets, and where the dashboard itself is located relatively far from the driver; despite this fact, a number of the switches must be operable in a simple manner. However, pursuant to the aforementioned German Offenlegungsschrift No. 28 27 338 it is not possible to accommodate all of these switches within the hub of the steering wheel or on the brackets; this possibility is only now offered by the arrangement of the present invention.

DESCRIPTION OF PREFERRED EMBODIMENTS

Referring now to the drawings in detail, the illustrated embodiment of an arrangement 1 for control switches and a steering wheel for a motor vehicle includes, in addition to the steering wheel 7, the steering column 2, and the steering arm 3, a frame member 10 which is disposed below the plane of the steering wheel, near the steering column 2, on the steering arm 3; the frame member 10 is disposed in a plane which is parallel to the plane of the steering wheel 7. Monitoring devices 11, such as lights, are provided on the frame member 10, at the top, in the transverse direction of the vehicle, and switch levers 14 as well as rotary switches 15 are provided on the sides. In relation to the steering wheel 7, the frame member 10 is dimensioned in such a way that when the steering wheel is viewed in plan, the upper half of the latter is substantially surrounded by the frame member 10. From a normal driving position, the driver of the vehicle can see all of the aforementioned monitoring devices and switch members beyond the periphery of the steering wheel, and can easily reach all of these devices with his hands. At the same time, that portion of the dashboard 17 of the vehicle where, for example, the speedometer and tachometer are disposed, is visible through the steering wheel and the interior of the closed frame member 10.

The frame member 10 is embodied as a onepiece molded part, and includes transverse arms 4 and 5 which essentially extend in the transverse direction of the vehicle; the bases of the transverse arms 4, 5 are rigidly connected with the steering arm 3. An upsidedown, U-shaped frame portion 6 for switches is disposed on the lateral, outer ends of the transverse arms 4, 5. The base 8 of the frame portion 6 faces the front 9 of the vehicle, with the planar upper surface of the base being at least partially angled-off in such a way that the driver of the vehicle can look at essentially right angles upon this angled-off surface. The monitoring devices 11 are disposed in or on this angled-off surface. The portion 6 of the frame member 10 furthermore includes side arms 12, 13 which extend approximately in the longitudinal direction of the vehicle, have planar upper surfaces, and contain the switch levers 14.

When viewed from the side, each of the switch levers 14 is essentially L-shaped, and can be operated from above by the driver of the vehicle for pressing the lever down; in the opposite direction, to pull the lever out or pivot it, the lever can be grasped from below from the outer side. The switch levers 14 can be set in two or more positions.

Rotary switches 15 are furthermore disposed at the connecting locations between the transverse arms 4, 5 and the associated arms 12, 13 of the frame portion 6. The axes of rotation of the rotary switches 15 extend in the transverse direction of the vehicle, and the rotary switches themselves are disposed in the plane of the frame member. The rotary switches 15 have a radially extending control element 16 which is directed upwardly toward the head of the driver, and which can be actuated or pivoted toward the front or toward the back.

The present invention is, of course, in no way restricted to the specific disclosure of the specification and drawings, but also encompasses any modifications within the scope of the appended claims.

What we claim is:

1. An arrangement for the steering wheel and control mechanisms of a motor vehicle having a front as well as a speedometer, including only two transverse arms that essentially extend in an inverted V-shaped configuration toward vehicle operator location and approximately in the transverse direction of the vehicle; each of said transverse arms having two ends, one of which is attached to the steering arm below the plane of said steering wheel and near the steering column and the other of which is remote from said steering column; the improvement in combination therewith which comprises:

an essentially U-shaped frame portion which serves for the mounting of said control mechanism in a forward direction and below the steering wheel having only said two transverse arms for facilitating view as to the control mechanisms visible through an open space above and ahead of said two transverse arms; said frame portion having a base and two arms, with that end of each of the latter remote from said base being fixedly connected to a respective one of said transverse arms at that end thereof remote from said steering column; said frame portion having an interior opening and being disposed in a plane which is approximately parallel to the plane of said steering wheel; said base of said frame portion being disposed between said steering column and the front of the vehicle in a location that results in optimum operating conditions and driver visibility especially also for commercial vehicles, such that said U-shaped frame portion is disposed in a non-disrupting location of the vehicle just below said steering wheel without appreciably affecting line of sight to the front of the vehicle and also the driver has enough free space for leg room so that the control mechanisms can be operated by the driver within easy reach from above as well as from below without accidental actuation from below by an unintentional movement of a knee of the leg of the driver and at the same time the speedometer is visible through the steering wheel as well through the interior opening of said U-shaped frame portion;

said transverse arms and said U-shaped frame portion being in the form of a closed frame member which, when said steering wheel is viewed in plan, has an essentially rectangular shape;

the dimensions of said frame member relative to said steering wheel being such that when the latter is viewed in plan, that portion of said steering wheel directed toward the front of the vehicle is approximately surrounded by said frame member;

said transverse arms being fixedly and integrally formed with said steering arm;

said base of said U-shaped frame portion having a planar, upwardly directed surface which is angled-off relative to the plane of said frame portion in such a way that the angle thereof, in relation to the surface upon which said vehicle is being driven, is greater than the angle of the plane of said steering wheel;

said control mechanisms including monitoring devices disposed on and along said planar, upwardly directed surface, of said base of said U-shaped frame portion;

said arms of said frame portion each having a planar, upwardly directed surface, on and along which are disposed further control mechanisms in the form of switch levers, each of which has at least two positions.

2. An arrangement in combination, according to claim 1, in which each of said switch levers, when viewed from the side, has an L-shaped configuration, with one leg thereof being connected to a respective arm, and the other leg extending from said first leg in a direction away from the other arm of said frame portion.

3. An in combination arrangement according to claim 2, in which each of said arms of said frame portion is provided with at least four of said switch levers.

4. An in combination-arrangement according to claim 1, in which said control mechanisms further include at least one rotary switch disposed in the region of each connection location between a given one of said transverse arms and the associated arm of said frame portion; each of said rotary switches has an axis of rotation which extends in the transverse direction of the vehicle and is disposed in the plane of said frame portion; each of said rotary switches furthermore has a radially extending control element that projects in the direction toward said steering wheel.

5. An arrangement in combination according to claim 4, in which said vehicle has a dashboard that is provided with instruments; and in which said frame member has an underside, remote from said steering wheel, which faces said dashboard and is provided with direct lighting means for said instruments.

* * * * *